United States Patent [19]

Gleim

[11] 4,448,676

[45] May 15, 1984

[54] METHOD OF REFORMING GASOLINE TO RAISE THE OCTANE THEREOF UTILIZING LOW VALENCE CHROMIUM COMPOSITED WITH NON-OXIDIZING HIGH SURFACE AREA SUPPORT

[75] Inventor: William K. T. Gleim, Seattle, Wash.

[73] Assignee: Energy Modification, Inc., Gainesville, Fla.

[21] Appl. No.: 514,603

[22] Filed: Jul. 18, 1983

Related U.S. Application Data

[63] Continuation-in-part of Ser. No. 335,447, Dec. 29, 1981, Pat. No. 4,394,252.

[51] Int. Cl.$^3$ .............................................. C10G 35/06
[52] U.S. Cl. .................................... 208/136; 208/134
[58] Field of Search ................................ 208/134, 136

[56] References Cited

PUBLICATIONS

N. S. Kozlov et al, "The Effect of Chromium on the Activity of Platinum–Alumina Catalysts in Dehydrogenation and Dehydrocyclization Reactions," Nefte Khimiya, (Petroleum Chemistry) vol. 19, No. 3, p. 370 (1979).

*Primary Examiner*—Curtis R. Davis
*Attorney, Agent, or Firm*—James W. Hellwege

[57] ABSTRACT

This invention relates to a method of reforming gasoline to raise the octane number thereof utilizing a novel catalyst comprising a low valence chromium metallic component composited with a non-oxidizing high surface area support. The low valence metallic component is present in divalent form or as a combination of the metallic state and the divalent form—preferably as a chloride and/or bromide. The preferred support is a high surface area coke.

6 Claims, No Drawings

METHOD OF REFORMING GASOLINE TO RAISE THE OCTANE THEREOF UTILIZING LOW VALENCE CHROMIUM COMPOSITED WITH NON-OXIDIZING HIGH SURFACE AREA SUPPORT

The present invention is a continuation-in-part of Ser. No. 335,447, filed Dec. 29, 1981 now U.S. Pat. No. 4,394,252.

BACKGROUND OF THE INVENTION

1. Field of the Invention

This invention relates to a method of reforming gasoline to raise the octane number thereof utilizing a novel catalyst comprising a low valence titanium, vanadium and/or chromium metallic component composited with a non-oxidizing high surface area support. The low valence metallic component is present in divalent form or as a combination of the metallic state and the divalent form—preferably a chloride and/or bromide and the support is preferably a high surface area coke.

2. Description of the Prior Art

Vanadium, titanium and chromium have previously been used as a catalytic component in hydrocarbon conversion processes.

In U.S. Pat. No. 3,282,828, colloidally dispersed unsupported vanadium halides which may be in divalent form are disclosed as suitable slurry catalyst in the hydrorefining or decontaminating of petroleum crude oil and other heavy hydrocarbon fractions.

However, as taught in U.S. Pat. No. 3,282,828, the use of vanadium-containing catalyst in fixed-bed catalytic processes or fixed-fluidized bed processes has been virtually precluded due to the difficulty of maintaining such catalyst in active condition. Likewise, moving-bed processes utilizing supported vanadium also have not been satisfactory.

N. S. Koslov et al in an article published in NEFTE KHIMIYA (Petroleum Chemistry), Vol. 19, No. 3, P. 37D (1979) entitled: THE EFFECT OF CHROMIUM ON THE ACTIVITY OF PLATINUM-ALUMINA CATALYST IN DEHYDRATION AND DEHYDROCYCLIZATION REACTIONS disclosed that addition of chromium to Pt-$Al_2O_3$ catalysts, reduced cracking side reactions and increased conversion and selectivity for n-heptane dehydrocyclization reactions. Koslov et al disclose that for the dehydrocyclization of n-heptane with their Pt-Cr-$Al_2O_3$ catalyst, coke increases with Cr content but goes through a maximum and then decreases. At 3% Cr the coke make is less than for a Pt-$Al_2O_3$ catalyst without Cr. The authors attribute the foregoing characteristics of chromium promoted Pt-$Al_2O_3$ catalysts to the increased dispersion and decreased particle size of platinum observed where the Pt is promoted with Cr within a given range.

In the present invention, it has been discovered that the reforming of gasoline can be effected utilizing a vanadium, titanium or chormium-containing catalyst which possesses and retains activity in both fixed-bed and moving-bed processes. The catalyst of the present invention comprises a combination of (a) one or more of the metallic components V, Ti and Cr in their lower valent states; the metallic components can be present in the +2 valence state or in the form of both the metal and +2 valence state metal such that the "average valence" in the catalyst may vary from about +1 up to +2; and, (b) a high surface area support for the metallic component(s) which is characterized by surface area maintenance at reaction and/or activation conditions and most importantly by the property of not oxidizing the metallic components to the +3 or higher valence states over the temperature range to which said catalyst is subjected. As will be explained more fully hereafter, this excludes the use of refractory oxides, such as the $Al_2O_3$ support of Koslov et al, which it has been found can under some conditions oxidize lower-valence salts such as metallic or divalent vanadium to higher oxidation states. A suitable support is a non-oxygen containing high surface area material such as high surface area coke.

SUMMARY OF THE INVENTION

This invention relates to a method of reforming gasoline to raise the octane number thereof utilizing a novel catalyst comprising a low valence titanium, vanadium and/or chromium metallic component composited with a non-oxidizing high surface area support. The low valence metallic component is present in divalent form—preferably a chloride and/or bromide. The support is preferably a high surface area coke.

The object of this invention is to provide a non-noble metal-containing catalyst for upgrading low octane gasoline fuel. Although other catalytic components, to the extent that they do not oxidize the catalytic component of the reforming catalyst, can also be present, the greatest economic advantage of the invention is attained where noble metals are not used in the refining catalyst. The reforming of gasoline to increase octane number involves basically three reactions:

1. Dehydrogenation of cyclohexanes to benzenes.
2. Dehydrogenation and rearrangement of alkylcyclopentanes to benzenes.
3. Cyclisation and dehydrogenation of straight chain heptanes, octanes and nonanes to benzenes.

Suitably such a process is carried out at high temperatures (400°–500° C.) and low $H_2$ pressures (5–50 Bar) with Pt-$PtCl_2$ or Pt-$PtBr_2$ on alumina or silica-alumina supports. The supply of platinum is limited, its price is high, its use is expanding and the reliability of its major source, the Republic of South Africa, is uncertain.

In its broadest aspect the method of the invention relates to a method of reforming a hydrocarbonaceous feedstock in the presence of a reforming catalyst the improvement utilizing a catalyst comprising a catalytic component of titanium, vanadium, chromium or mixtures of such elements, in the divalent state or both the divalent and metal state such that the "average valence" is from about +1 up to +2, composited with a high surface area supported which will not oxidize such catalytic components to an elevated valence state at reforming conditions; that is, a valence state of +3 or higher.

The catalyst of the invention comprises a catalytic component selected from the group consisting of titanium, vanadium and chromium and mixtures thereof. The catalytic component is present in divalent form or in both metal and divalent form with the ratio of divalent form to metal being about 1:1 or greater; suitably a ratio wherein the major portion of the metal is present in divalent form. The catalytic component is associated with a high surface area support which will not oxidize such catalytic component at the conditions of use.

Preferably the catalytic component is present as a chloride or bromide or as a mixture of chlorides and bromides.

The high surface area support is preferably coke, suitably prepared by low temperature tar formation from brown coals, lignite, peat or coal. Such cokes have high surface areas of from about 200 to about 500 $M^2/g$, suitably above about 250 $M^2/g$ and are readily available.

The catalytic component of the reforming catalyst may be present in amounts which vary from about 2% to about 15% by weight based on the weight ratio of metal in the catalytic component to high surface area support and preferably from about 5% to about 10% by weight.

The method of achieving the low valence required for the metallic component; that is, the divalent form or combination of metallic and divalent form, is by heating the support impregnated with two valent metal ions in a reducing atmosphere (a hydrogen atmosphere is suitable) at a temperature of from about 400° to 800° C. The lower the temperature selected, the longer the exposure to the $H_2$ atmosphere required. For instance, at a temperature of about 700° C., continuous contact with a $H_2$ atmosphere yields satisfactory results, whereas, at a temperature of 500° C., an exposure of about 8 hours is provided.

The method developed for preparing the reforming catalyst comprises impregnating the selected high surface area support at non-oxidizing conditions with a solution of the catalytic component in divalent form; and, heating the impregnated support at a temperature of from about 400° C. to about 800° C. in a reducing atmosphere to form the desired catalyst wherein the catalytic component is present in divalent form or in an admixture of the divalent form and the metal, the ratio of the catalytic component present as the metal being at least 1:1.

EXAMPLE 100 g of a high surface area coke—450 $m^2/g$—10-30 mesh, prepared by low temperature tar formation from peat—German Torf Institute, or from brown coal by Rheinische Braun Kohlenwerke A.G., West Germany, or from lignite by Neyvdi Lignite Co., Ltd., India—is impregnated with 100 ml N HCl containing 20 g $VCL_2$ in an $N_2$ atmosphere. After evaporating the HCl and drying, the coke contains 8.35% V. When carrying out the same procedure with $CrCl_2$ and $TiCl_2$, the coke will contain 8.5% Cr and 8.05% Ti respectively.

Practically the same amount of metal ion is impregnated as the dibromide if 35 g of the corresponding dibromides are dissolved in 100 ml 1 N HBr and this solution adsorbed on the high surface coke under an $N_2$ atmosphere. The two valent metal halides are available commercially. But solutions of two valent metal ions in HCl or HBr can most economically be obtained by electrochemically reducing, at a voltage of 2.5, higher valent metal ions, like $TlCl_3$, $CrCl_3$, $VO_2Cl_2$, dissolved in 1 N HCl or the corresponding bromides in 1 N HBr. $VO_2Cl_2$ is conveniently obtained by refluxing $V_2O_5$ in 20% HCl.

A 50 cm section of a pipe with a 2 cm diameter serving as a reactor is filled with 100 ml catalyst, consisting of 20% $VCl_2$ on coke, under a nitrogen blanket. The nitrogen is displaced by hydrogen and the reactor heated to 700° C. for one hour, while the catalyst bed is swept by hydrogen. This will reduce the ratio of halide to metal ion from 2.0 to 1.8. The temperature is then reduced to 450° C.

Preheated to 450° C. n-heptane vapors, together with hydrogen at 10 Bar pressure, are passed through the catalyst bed at 450° C. and then condensed.

At ½ LHSV—liquid hourly space velocity—50% of the heptane is converted to toluene, meaning that 25 ml n-heptane are converted to 20 ml toluene at that rate. Passing a Midcontinent naphtha through the catalyst bed at a catalyst temperature of 470° C., a pressure of 10 Bar, a LHSV of 2.5 and a $H_2$/feed mol ratio of 4, the following results are obtained:

|  | Charge Midcontinent Naphtha | 86 Percent Yield |
|---|---|---|
| Spec gr. at 15° C. | 0.7641 | 0.7811 |
| I.B.P. °C. 75 |  | 51 |
| 10% 110 |  | 80 |
| 50% 140 |  | 129 |
| 90% 170 |  | 170 |
| E.P. 195 |  | 190 |
| Paraffins % | 48 | 34.6 |
| Naphthenes % | 45 | 10.2 |
| Aromatics % | 7 | 41.2 |
| $C_1$ to $C_4$ |  | 14 |
| R.O.N. + 3 ml TEL | 51 | 94.5 |

These results compare favorably with results obtained with nobel metal catalysts.

Thus, a new method and catalyst for reforming feedstocks utilizing a low-valence vanadium, chromium and/or titanium catalytic component composited on a non-oxidizing high surface area support is disclosed. Although a specific example of the invention has hereinabove been described it will be obvious to those skilled in the art, that various modifications may be made without departing from the spirit of the invention which is intended to be limited solely by the appended claims.

I claim:

1. In a method of reforming a gasoline feed in the presence of a reforming catalyst to raise the octane number thereof, the improvement which comprises utilizing a reforming catalyst comprising:
   (a) chromium present in divalent form or in an admixture of the divalent form and the metal, the ratio of the chromium in divalent form to the chromium present as the metal being at least 1:1; and
   (b) a non-oxygen containing high surface area support for said chromium which will not oxidize said catalytic component at reforming conditions to a valence state higher than the divalent valence state.

2. The method of claim 1 further characterized in that the high surface area support comprises coke having a surface area of from about 200 to about 500 $M^2/g$.

3. The method of claim 1 further characterized in that the chromium is present in an amount of from about 5% to about 10% by weight based on the weight ratio of chromium metal in the catalytic component to high surface area support.

4. The method of claim 1 further characterized in that the chromium is present in an amount in excess of about 5% by weight based on the weight ratio of chromium metal in the catalytic component to high surface area support.

5. The method of claim 2 further characterized in that the chromium is present in an amount of from about 5% to about 10% by weight based on the weight ratio of chromium metal in the catalytic component to high surface area support.

6. The method of claim 2 further characterized in that the chromium is present in an amount in excess of about 5% by weight based on the weight ratio of chromium metal in the catalytic component to high surface area support.

* * * * *